US010511175B2

(12) United States Patent
Kogo et al.

(10) Patent No.: US 10,511,175 B2
(45) Date of Patent: Dec. 17, 2019

(54) INFORMATION PROCESSING DEVICE, INFORMATION PROCESSING METHOD, AND RECORDING MEDIUM

(71) Applicant: NEC CORPORATION, Tokyo (JP)

(72) Inventors: Takuma Kogo, Tokyo (JP); Ryo Hashimoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 14 days.

(21) Appl. No.: 15/778,741

(22) PCT Filed: Nov. 18, 2016

(86) PCT No.: PCT/JP2016/084200
§ 371 (c)(1),
(2) Date: May 24, 2018

(87) PCT Pub. No.: WO2017/090519
PCT Pub. Date: Jun. 1, 2017

(65) Prior Publication Data
US 2018/0351367 A1 Dec. 6, 2018

(30) Foreign Application Priority Data
Nov. 26, 2015 (JP) .................................. 2015-230329

(51) Int. Cl.
*H02J 3/46* (2006.01)
*H02J 3/38* (2006.01)
(Continued)

(52) U.S. Cl.
CPC .............. *H02J 3/46* (2013.01); *G05B 19/042* (2013.01); *G06Q 10/04* (2013.01); *G06Q 50/06* (2013.01);
(Continued)

(58) Field of Classification Search
None
See application file for complete search history.

(56) References Cited

U.S. PATENT DOCUMENTS 8,588,991 B1 * 11/2013 Forbes, Jr. .............. G05B 19/02
700/295
9,134,353 B2 * 9/2015 Jia .......................... G06Q 40/04
(Continued)

FOREIGN PATENT DOCUMENTS

JP   2001-177990 A   6/2001
JP   2004-088824 A   3/2004
(Continued)

OTHER PUBLICATIONS

International Search Report of PCT/JP2016/084200 dated Dec. 13, 2016 [PCT/ISA/210].
(Continued)

*Primary Examiner* — Ramesh B Patel
(74) *Attorney, Agent, or Firm* — Sughrue Mion, PLLC (57) ABSTRACT

An information processing device receives plan necessary information relating to a first power generation device and a second power generation device having a power generation output that is more susceptible to an external environment than a power generation output of the first power generation device; and generates power generator operation plans, for the first power generation device and the second power generation device, that include a power generation curtailment plan to curtail a power generation output in the second power generation device, based on the plan necessary information and an operating cost in a power system including the first power generation device and the second power generation device; transmits a power generator operation plan for the first power generation device; and transmits a power generator operation plan including a power genera-
(Continued)

tion curtailment plan for the second power generation device to a device controlling or managing the second power generation device.

10 Claims, 5 Drawing Sheets

(51) Int. Cl.
*G05B 19/042* (2006.01)
*G06Q 50/06* (2012.01)
*G06Q 10/04* (2012.01)
*H02J 3/00* (2006.01)

(52) U.S. Cl.
CPC ...... *H02J 3/382* (2013.01); *G05B 2219/2639* (2013.01); *H02J 2003/003* (2013.01); *H02J 2003/007* (2013.01)

(56) References Cited

U.S. PATENT DOCUMENTS

| | | | | |
|---|---|---|---|---|
| 2012/0278220 | A1* | 11/2012 | Chassin | G06Q 40/00 705/37 |
| 2014/0018969 | A1* | 1/2014 | Forbes, Jr. | H02J 3/32 700/295 |
| 2014/0039709 | A1* | 2/2014 | Steven | G06Q 10/06 700/291 |
| 2015/0039145 | A1* | 2/2015 | Yang | G05B 13/02 700/291 |
| 2017/0003700 | A1* | 1/2017 | Pavlovski | G06Q 50/06 |
| 2018/0299852 | A1* | 10/2018 | Orsini | G06Q 50/06 |
| 2018/0351367 | A1* | 12/2018 | Kogo | H02J 3/46 |
| 2018/0367320 | A1* | 12/2018 | Montalvo | G05B 15/02 |

FOREIGN PATENT DOCUMENTS

| | | |
|---|---|---|
| JP | 2007-330002 A | 12/2007 |
| JP | 2009-240080 A | 10/2009 |

OTHER PUBLICATIONS

Written Opinion of PCT/JP2016/084200 dated Dec. 13, 2016 [PCT/ISA/237].

Yusuke Udagawa et al., "Impacts of the Uncertainty in Photovoltaic Yield Predictions on the Supply-Demand Balance and the Cost of Generating Electricity", the Papers of Technical Meeting (the Papers of Joint Meeting of New Energy and Environment, Metabolism Society and Environmental System), the Institute of Electrical Engineers of Japan (IEEJ), FTE13-60, MES-13-16 (2013), Nov. 21, 2013, pp. 85-95, vol. 2013, No. 1.

\* cited by examiner

INFORMATION PROCESSING DEVICE, INFORMATION PROCESSING METHOD, AND RECORDING MEDIUM

CROSS REFERENCE TO RELATED APPLICATIONS

This application is a National Stage of International Application No. PCT/JP2016/084200, filed Nov. 18, 2016, claiming priority based on Japanese Patent Application No. 2015-230329, filed Nov. 26, 2015, the contents of all of which are incorporated herein by reference in their entirety.

TECHNICAL FIELD

The present invention relates to management of a power generation device, and more particularly, to an information processing device, an information processing method, and a recording medium for managing an operation of a power generation device.

BACKGROUND ART

In a power system, an output from a power generation device connected to the power system for regulation of supply and demand of power is generally curtailed (hereinafter referred to as "power generation curtailment") (e.g., refer to PTL 1). Note that the power system is a system that includes the power generation device and supplies power generated by the power generation device to consumers.

In order to minimize an operating cost of the entire power system, a plan for starting and stopping the power generation device and including the power generation curtailment (hereinafter referred to as a "power generator operation plan") is further generated.

The power generator operation plan needs to satisfy not only a constraint for matching the supply and demand of power, but also a constraint for stably supplying power to, for example, ensure a short-period regulation capacity, ensure an upward spinning reserve and a downward spinning reserve, and the like (e.g., refer to NPL 1).

The regulation capacity is a capacity to control necessary power supply and demand. The short-period regulation capacity is a regulation capacity in a short period of time relative to a period for the entire power generator operation plan. In general power supply and demand, the short-period regulation capacity is a regulation capacity in units of minutes (e.g., 10 minutes or 30 minutes) or hours (e.g., one hour or two hours).

In this manner, the power generator operation plan needs to be made in consideration of power generation curtailment in the power generation device in such a way as to satisfy the constraints described above.

Further, the power generator operation plan needs to be made in consideration of economic efficiency while satisfying the constraints described above.

In addition, a power generation device using renewable energy (RE) (hereinafter referred to as "RE power generator") as typified by a photovoltaic power generator and a wind power generator has been widely used.

The power generation curtailment in the RE power generator affects economic efficiency (operating cost). For example, when a combination of power generation curtailment in a plurality of RE power generators (e.g., a photovoltaic power generator group and a wind power generator group) is inappropriate, the necessary short-period regulation capacity and the upward spinning reserve and the downward spinning reserve increase. In order to handle the increase, for example, the number of operating thermal power generators, which require higher operating costs than the RE power generators, increases. In other words, when the power generator operation plan is inappropriate, the operating cost in the power system increases.

Thus, in order to widely use the RE power generators, there is a demand for generating a power generator operation plan capable of appropriately curtailing power generation in the RE power generators included in the power system. In particular, there is a demand for generating a power generator operation plan including a plan for executing power generation curtailment in RE power generation devices (hereinafter referred to as a "power generation curtailment plan") in such a way as to minimize an operating cost while satisfying the constraints described above.

CITATION LIST

Patent Literature

[PTL 1] Japanese Unexamined Patent Application Publication No. 2001-177990

Non Patent Literature

[NPL 1] Yusuke Udagawa, Kazuhiko Ogimoto, Takashi Ikegami, et al. "Impacts of the Uncertainty in Photovoltaic Yield Predictions on the Supply-Demand Balance and the Cost of Generating Electricity", the Papers of Technical Meeting (the Papers of Joint Meeting of New Energy and Environment, Metabolism Society and Environmental System), the Institute of Electrical Engineers of Japan (IEEJ), FTE13-60, MES-13-16 (2013), vol. 2013 no. 1, pp. 85-95, Nov. 21, 2013

SUMMARY OF INVENTION

Technical Problem

However, RE power generators are more susceptible to an external environment such as weather than thermal power generation devices or the like. Accordingly, a device (e.g., a device described in PTL 1) that generates a power generation curtailment plan associating with a thermal power generation device or the like cannot generate a power generation curtailment plan associating with a power generation device that is susceptible to an external environment, like the RE power generator.

Further, NPL 1 is a paper regarding impacts on the cost and is not a technique for generating a power generation curtailment plan as described above.

In other words, PTL 1 and NPL 1 have an issue that it is impossible to generate a power generator operation plan including a power generation curtailment plan associating with a power system including an RE power generator.

An object of the present invention is to solve the above-described issues and provide an information processing device, an information processing method, and a recording medium for generating a power generator operation plan including a power generation curtailment plan associating with a power system including an RE power generator.

Solution to Problem

An information processing device according to one aspect of the present invention includes: a processor; and a memory including a program. The processor reading the program and configured to receive plan necessary information being information including information relating to a first power generation device and a second power generation device having a power generation output that is more susceptible to an external environment than a power generation output of the first power generation device; generate power generator operation plans, for the first power generation device and the second power generation device, that include a power generation curtailment plan to curtail a power generation output in the second power generation device, based on the plan necessary information and an operating cost in a power system including the first power generation device and the second power generation device; transmit a power generator operation plan for the first power generation device and transmit a power generator operation plan including a power generation curtailment plan for the second power generation device to a device controlling or managing the second power generation device through the communication means.

An information processing method according to one aspect of the present invention includes: receiving plan necessary information being information including information relating to a first power generation device and a second power generation device having a power generation output that is more susceptible to an external environment than a power generation output of the first power generation device; generating power generator operation plans, for the first power generation device and the second power generation device, that include a power generation curtailment plan to curtail a power generation output in the second power generation device, based on the plan necessary information and an operating cost in a power system including the first power generation device and the second power generation device; transmitting a power generator operation plan for the first power generation device; and transmitting a power generator operation plan including a power generation curtailment plan for the second power generation device to a device controlling or managing the second power generation device.

A computer-readable recording medium according to one aspect of the present invention embodies a program. The program causes a computer to perform a method. The method includes: receiving plan necessary information being information including information relating to a first power generation device and a second power generation device having a power generation output that is more susceptible to an external environment than a power generation output of the first power generation device; generating power generator operation plans, for the first power generation device and the second power generation device, that include a power generation curtailment plan to curtail a power generation output in the second power generation device, based on the plan necessary information and an operating cost in a power system including the first power generation device and the second power generation device; transmitting a power generator operation plan for the first power generation device; and transmitting a power generator operation plan including a power generation curtailment plan for the second power generation device to a device controlling or managing the second power generation device.

Advantageous Effects of Invention

According to the present invention, it is possible to provide an advantageous effect of generating a power generator operation plan including a power generation curtailment plan associating to a power system including an RE power generator.

DESCRIPTION OF EMBODIMENTS

Next, an example embodiment of the present invention will be described with reference to the drawings.

Note that the drawings illustrate the example embodiment of the present invention. However, the present invention is not limited to the illustration of each of the drawings. In each of the drawings, like components are denoted by the same reference numerals and a repeated explanation may be omitted.

In the drawings used for the following explanation, descriptions of components in a portion that is not related to the explanation of the example embodiment of the present invention are omitted and the illustration thereof may be omitted.

The terms used in the explanation of this example embodiment are summarized below, although some of the terms are already described above.

The term "renewable energy (RE) power generator" refers to a device (power generation device) that generates electricity by using energy resources supplemented by natural force, such as a photovoltaic power generation device and a wind power generation device. The RE power generator is a power generation device having output power that is susceptible to an external environment (weather etc.).

On the other hand, a thermal power generation device, a hydroelectric power generation device, a pumped-storage power generation device, or the like is a power generation device that is insusceptible to an external environment (e.g., weather). These power generation devices are power generation devices having a power generation output that can be easily regulated. Such a power generation device is also referred to as "non-renewable energy or exhaustible energy power generator".

The power generation device that is insusceptible to the external environment is hereinafter referred to as a first power generation device. The power generation device (RE power generator) that is susceptible to the external environment is referred to as a second power generation device. Note that the first power generation device may include a device that stores power, such as a storage battery.

Relative characteristics of each power generation device will be described below.

First Power Generation Device (1) A power generation output is insusceptible to an external environment (e.g., weather).

(2) The power generation output can be easily regulated.

(3) A prediction error and a short-period fluctuation predicted value are small.

(4) An operating cost is high.

Second Power Generation Device (1) An operating cost is low.

(2) A power generation output is susceptible to an external environment (e.g., weather).

(3) A prediction error and a short-period fluctuation predicted value are large.

(4) A cost occurs with respect to curtailment of the power generation output.

As already described above, the term "power generator operation plan" is a plan for starting and stopping a power generation device included in a power system. According to the example embodiment of the present invention, the power generator operation plan is generated in each predetermined time unit of the power generation device to be managed. The predetermined time unit is, for example, one hour. However, the predetermined time unit is not limited to one hour. According to the example embodiment of the present invention, for example, the power generator operation plan is generated in such a way as to minimize an operating cost in the power system, i.e., to achieve a minimum operating cost associated with a power generation system. However, the minimum operating cost need not necessarily be a theoretically minimum cost. The minimum operating cost associating with processing performance according to the example embodiment of the present invention may be a minimum operating cost within a range that satisfies a predetermined condition. For example, the minimum operating cost may be a minimum operating cost that can be calculated based on information that can be acquired in the predetermined time unit described above according to the example embodiment of the present invention.

The power generator operation plan includes a power generation curtailment plan described below.

The term "power generation curtailment plan" refers to a plan for curtailing the output of the power generation device (power generation curtailment). According to the example embodiment of the present invention, the power generation curtailment plan is generated in each predetermined time unit of the power generation device to be managed. The predetermined time unit is the same as the predetermined time unit of the power generator operation plan described above, and is, for example, one hour. However, the predetermined time unit is not limited to one hour. According to the example embodiment of the present invention, the output of the power generation device connected to the power system is curtailed for, for example, regulation of supply and demand of power. Note that according to the example embodiment of the present invention, the power generation curtailment plans for the first power generation device and the second power generation device are generated. However, the power generation curtailment plan for the first power generation device is not particularly limited. For example, the power generation curtailment plan for the first power generation device may be a plan similar to the power generation curtailment plan that is generally generated. Accordingly, the description of the power generation curtailment plan for the first power generation device will be omitted in the following description. In other words, the example embodiment of the present invention is described below assuming that the power generation curtailment plan for the second power generation device is generated.

First Example Embodiment

A first example embodiment of the present invention will be described below with reference to the drawings.

An information processing device 1 according to the first example embodiment of the present invention manages power generation devices (hereinafter referred to as "power generation devices P") connected to the information processing device 1. Further, the information processing device 1 manages not only the power generation devices P, but also other power generation devices (hereinafter referred to as "power generation devices R") included in a power system.

At least a part of the power generation devices P and/or the power generation devices R may include an RE power generator. Specifically, at least some of the power generation devices P and/or the power generation devices R may include a power generation device (second power generation device) having a power generation output that is susceptible to an external environment (e.g., weather), such as a photovoltaic power generation device. The power generation devices P and the power generation devices R may include a power generation device (first power generation device) that is insusceptible to an external environment (e.g., weather), i.e., capable of regulating a power generation output regardless of the external environment. For example, the power generation devices P and the power generation devices R may include a thermal power generation device, a hydroelectric power generation device, a pumped-storage power generation device, or a storage battery.

It is assumed that, in the following explanation, for clarity of the explanation, the power generation device P is a power generation device (first power generation device) that is insusceptible to the external environment, like the thermal power generation device. On the other hand, it is assumed that the power generation device R is a power generation device (second power generation device (RE power generator)) having a power generation output that is susceptible to the external environment.

The information processing device 1 generates power generator operation plans for managing the power generation devices P and the power generation devices R. The power generator operation plan includes a power generation curtailment plan for the power generation devices R.

Note that the information processing device 1 generates a power generator operation plan in such a way as to minimize an operating cost of the power system as described in detail below.

[Description of Configuration]

A configuration of the information processing device 1 according to the first example embodiment of the present invention will now be described.

Figure 1:
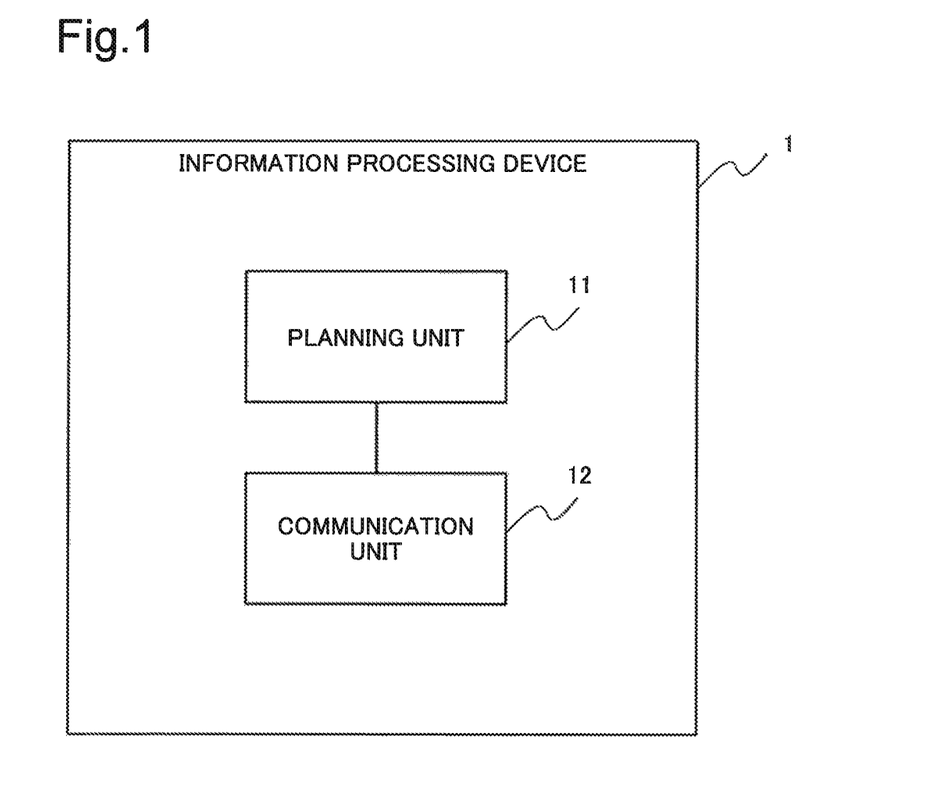
FIG. 1 is a block diagram illustrating an example of a configuration of an information processing device according to a first example embodiment of the present invention.

FIG. 1 is a block diagram illustrating an example of the configuration of the information processing device 1 according to the first example embodiment.

As illustrated in FIG. 1, the information processing device 1 according to the first example embodiment includes a planning unit 11 and a communication unit 12.

The communication unit 12 acquires (receives) information (hereinafter referred to as "plan necessary information") relating to a power generation device and demand power for the power generator operation plan as information necessary for operation in the planning unit 11 described below. More specifically, the communication unit 12 acquires, as plan necessary information, at least a predicted value of demand power in a power system for the power generator operation plan and a predicted value of the power generation output of the power generation device R (second power generation device) included in the power system.

The communication unit 12 further transmits the power generator operation plan generated by the planning unit 11 to the power generation device P (first power generation device).

Furthermore, the communication unit 12 transmits the power generator operation plan including the power generation curtailment plan generated by the planning unit 11 to a device (hereinafter referred to as a "control management device") that controls and/or manages (hereinafter collectively referred to as "manage") the power generation device R (second power generation device). As described in detail below, in the description of this example embodiment, the power generation device R is managed by a control management device 3 illustrated in FIG. 2. In other words, the control management device 3 is the device that manages the power generation device R (second power generation device).

As described above, the planning unit 11 acquires the plan necessary information through the communication unit 12.

The planning unit 11 generates (determines) power generator operation plans for the power system including the power generation device P (first power generation device) and the power generation device R (second power generation device) based on the plan necessary information. However, the planning unit 11 generates (determines), as the power generator operation plan, the power generator operation plan including the power generation curtailment plan relating to the power generation device R (second power generation device).

In the generation (determination) of the power generator operation plan, the planning unit 11 generates (determines) the power generation curtailment plan and the power generator operation plan in such a way as to minimize the operating cost in the entire power system including the power generation devices P and the power generation devices R. The generation of the power generation curtailment plan and the power generator operation plan in the planning unit 11 will be described in detail below.

Note that a period of the power generator operation plan generated by the planning unit 11 is not particularly limited. For example, the planning unit 11 may generate a power generator operation plan for one day on the following day. Alternatively, the planning unit 11 may generate a power generator operation plan for a plurality of days from the following day. More alternatively, the planning unit 11 may generate a power generator operation plan for a predetermined time range (e.g., 12 hours) which is shorter than one day.

The planning unit 11 then transmits the generated power generator operation plan to the power generation device P (first power generation device) through the communication unit 12. Further, the planning unit 11 transmits the power generator operation plan including the power generation curtailment plan to a device (e.g., the control management device 3) that manages the power generation device R (second power generation device) through the communication unit 12. Note that the planning unit 11 does not need to divide the transmitted information into the information for the power generation device P (first power generation device) and the information for the device that manages the power generation device R (second power generation device). The planning unit 11 may transmit the power generator operation plan including the power generation curtailment plan to the power generation device P (first power generation device) and the device that manages the power generation device R (second power generation device). In other words, the planning unit 11 may transmit the same information (power generator operation plan including the power generation curtailment plan) to the power generation device P (first power generation device) and the device that manages the power generation device R (second power generation device). In this case, each of devices may retrieve necessary information from the power generator operation plan for operation.

Figure 2:
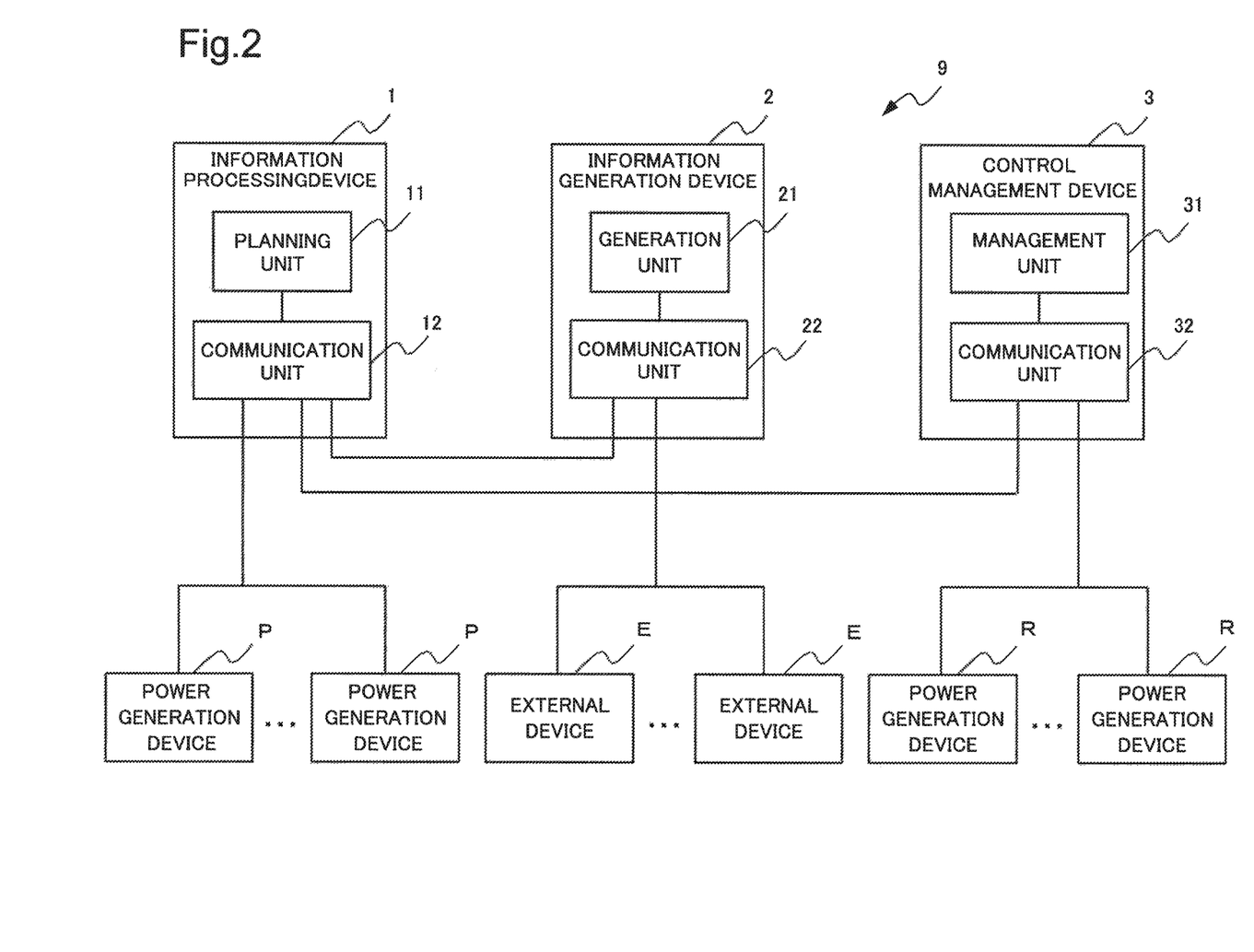
FIG. 2 is a block diagram illustrating an example of a configuration of a power generation system including the information processing device according to the first example embodiment.

Next, in order to explain the information processing device 1 in more detail, a power generation system 9 including the information processing device 1 will be described with reference to the drawings.

FIG. 2 is a block diagram illustrating an example of a configuration of the power generation system 9 including the information processing device 1 according to the first example embodiment.

As illustrated in FIG. 2, the power generation system 9 includes the information processing device 1, an information generation device 2, the control management device 3, the power generation devices P, the power generation devices R, and external devices E. Referring to FIG. 2, the devices are connected by using a predetermined communication path.

The information processing device 1, the power generation device P, and the power generation device R are already described above. Accordingly, descriptions of the information processing device 1, the power generation device P, and the power generations device R are omitted as needed, and the information generation device 2 and the control management device 3 will be described in detail.

The control management device 3 manages the connected power generation device R (second power generation device). Accordingly, the control management device 3 includes a management unit 31 and a communication unit 32.

The communication unit 32 receives the power generator operation plan including the power generation curtailment plan for the power generation device R (second power generation device) from the information processing device 1.

The management unit 31 determines a power allotment for the connected power generation device R (second power generation device) based on the power generation curtailment plan. Note that the allotment (curtailed power) determined by the management unit 31 is not particularly limited. The management unit 31 may determine the power allotment based on the type of the power generation device R (e.g., the type of the RE power generator) and the power generation output of the power generation device R.

Further, the management unit 31 transmits the determined allotment (curtailed power) for each of the power generation devices R to each of the power generation devices R through the communication unit 32.

Each of the power generation devices R (second power generation devices) controls the power generation output based on the received allotment (curtailed power).

The information generation device 2 transmits the plan necessary information to the information processing device 1. Accordingly, the information generation device 2 includes a generation unit 21 and a communication unit 22.

The communication unit 22 acquires information (hereinafter referred to as "generation source information") necessary for the generation unit 21 to generate the plan necessary information from external devices (hereinafter referred to as the "external devices E").

The external devices E are not particularly limited. The external devices E may be selected depending on the plan necessary information that is necessary for the information processing device 1. For example, the external device E may be a device that provides meteorological data, or a device that provides past demand power data. The external device E may be a storage device such as a database.

Note that one or more external devices E may be provided. The communication unit 22 may select the necessary external device E in response to a request from the generation unit 21 and may acquire the generation source information.

The generation source information is not particularly limited. The generation source information may be determined according to the plan necessary information generated by the information generation device 2. For example, the generation source information may be information related to the demand, such as a demand power predicted value, a fluctuation rate of demand power for short-period, and a prediction error rate of demand power. Alternatively, the generation source information may be information related to the power generation of the power generation device R (second power generation device), such as a predicted value of power generation, a predicted value of fluctuation rate of a power generation for short-period, a predicted error rate of power generation, and a penalty cost for power generation curtailment.

Note that the predicted value of fluctuation rate of a power generation for short-period is a predicted value of a ratio of a fluctuation range of a power generation output to the power generation output in a time unit shorter than a unit time in the power generator operation plan. The predicted error rate of power generation is an error rate in the predicted value of power generation. The penalty cost for power generation curtailment is a cost associated with the curtailment of power generation.

The generation unit 21 generates the plan necessary information as information that can be used by the planning unit 11 of the information processing device 1 based on the generation source information described above. Further, the generation unit 21 transmits the generated plan necessary information to the information processing device 1 through the communication unit 22.

Note that FIG. 2 illustrates the information generation device 2 and the control management device 3 as one device. However, the configuration of the information generation device 2 and/or the control management device 3 is not limited to the configuration of one device.

Figure 3:
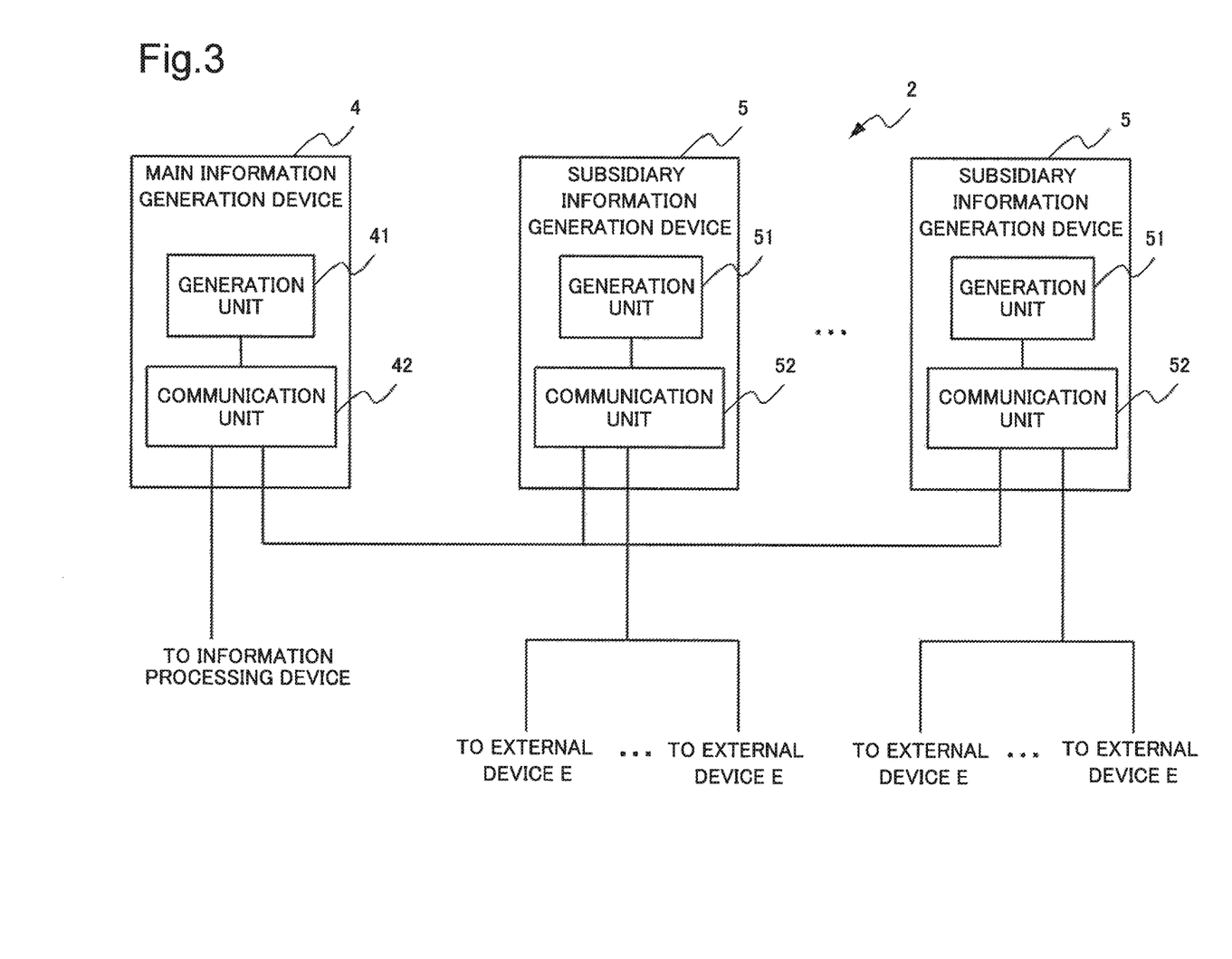
FIG. 3 is a block diagram illustrating an example of a configuration of an information generation device according to the first example embodiment.

FIG. 3 is a block diagram illustrating an example of the configuration of the information generation device 2 according to the first example embodiment.

A main information generation device 4 and a subsidiary information generation device 5 constitute the information generation device 2. Specifically, a generation unit 41 and a generation unit 51 constitute the generation unit 21. A communication unit 42 and a communication unit 52 constitute the communication unit 22.

The information generation device 2 illustrated in FIG. 3 includes the main information generation device 4 and at least one subsidiary information generation device 5. The information generation device 2 illustrated in FIG. 3 has a hierarchical configuration.

The subsidiary information generation device 5 includes the generation unit 51 and the communication unit 52.

The communication unit 52 acquires the generation source information from the external devices E in a manner similar to the communication unit 22 of the information generation device 2 described above by using FIG. 2.

The generation unit 51 generates at least a part of plan necessary information (subsidiary plan necessary information) based on the acquired generation source information in a manner similar to the generation unit 21 of the information generation device 2 described above by using FIG. 2. Further, the generation unit 51 transmits the generated subsidiary plan necessary information to the main information generation device 4 through the communication unit 52.

The main information generation device 4 includes the generation unit 41 and a communication unit 42.

The communication unit 42 acquires the subsidiary plan necessary information from the subsidiary information generation device 5.

The generation unit 41 generates the plan necessary information based on the whole or a part of the received subsidiary plan necessary information. Further, the generation unit 41 transmits the generated plan necessary information to the information processing device 1 through the communication unit 42.

Note that the main information generation device 4 may be connected to some of the external devices E through the communication unit 42 to acquire a part of the generation source information and may use the acquired generation source information to generate the plan necessary information.

The external devices E to which the subsidiary information generation device 5 is connected are not particularly limited.

For example, it is assumed that the power generation devices R (second power generation devices) include a photovoltaic power generation device and a wind power generation device. Also, it is assumed that the external devices E include the external device E that transmits information related to the photovoltaic power generation device, and the external device E that transmits information related to the wind power generation device. Further, it is assumed that the subsidiary information generation device 5 is connected to the external devices E that transmit information related to respective types of power generation devices R (second power generation devices). In this case, the subsidiary information generation device 5 generates (calculates) subsidiary plan necessary information related to various types of power generation devices R (second power generation devices). The main information generation device 4 generates plan necessary information gathering various types of power generation devices R generated by the subsidiary information generation device 5.

Figure 4:
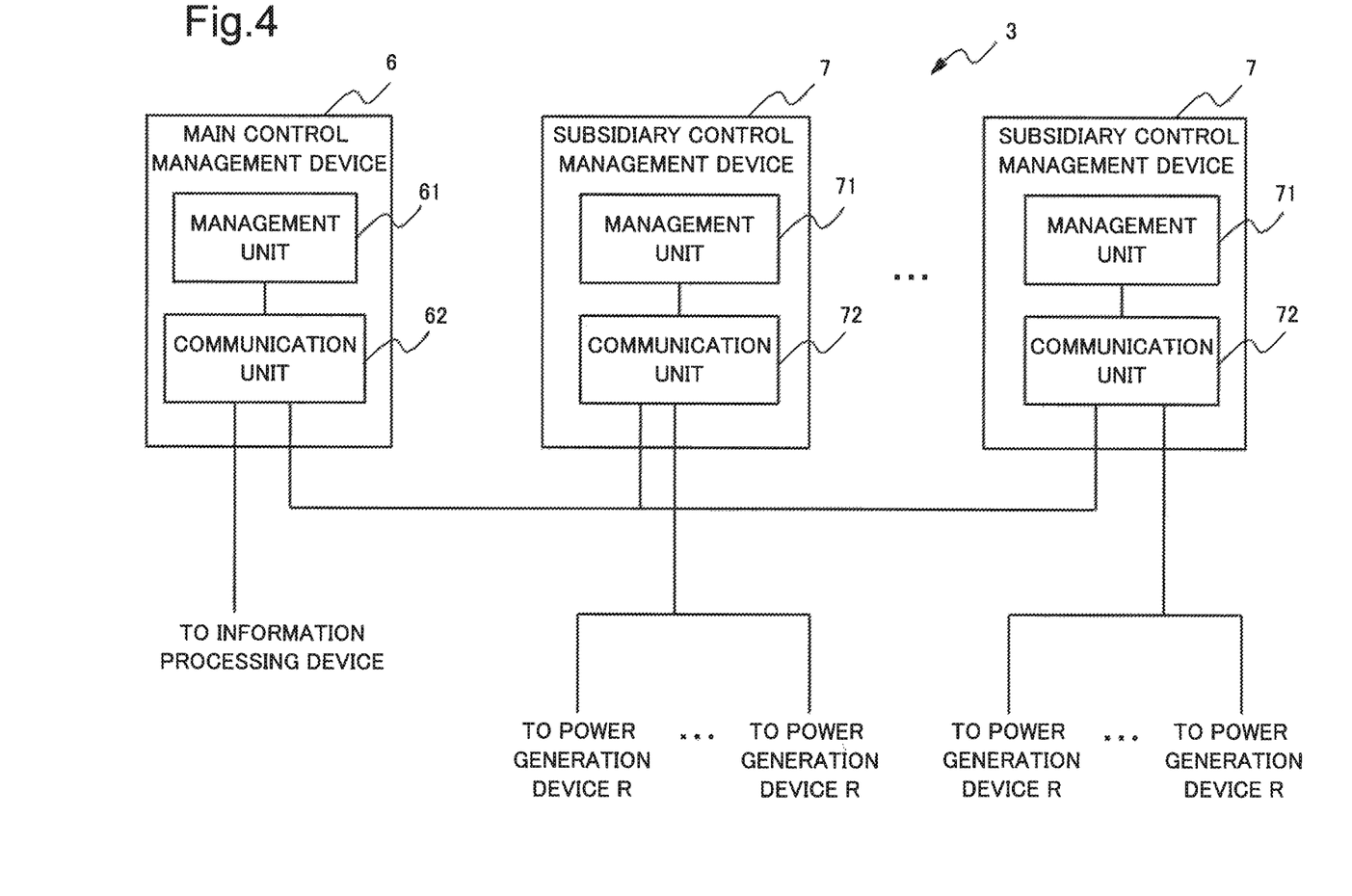
FIG. 4 is a block diagram illustrating an example of a configuration of a control management device according to the first example embodiment.

FIG. 4 is a block diagram illustrating an example of a configuration of the control management device 3 according to the first example embodiment.

A main control management device 6 and a subsidiary control management device 7 constitute the control management device 3. Specifically, a management unit 61 and a management unit 71 constitute the management unit 31. A communication unit 62 and a communication unit 72 constitute the communication unit 32.

The control management device 3 illustrated in FIG. 4 includes the main control management device 6 and at least one subsidiary control management device 7. The control management device 3 illustrated in FIG. 4 has a hierarchical configuration.

The main control management device 6 includes the management unit 61 and the communication unit 62.

The communication unit 62 receives the power generator operation plan including the power generation curtailment plan from the information processing device 1.

The management unit 61 determines an allotment (power generator operation plan including the power generation curtailment plan) to be transmitted to the subsidiary control management device 7 based on the power generator operation plan (in particular, the power generation curtailment plan). More specifically, the management unit 61 determines an allotment (power curtailment amount) for the power generation device R connected to the subsidiary control management device 7.

Further, the management unit 61 transmits the determined allotment (power generator operation plan including the power generation curtailment plan) to the subsidiary control management device 7 through the communication unit 62.

The subsidiary control management device 7 includes the management unit 71 and the communication unit 72.

The communication unit 72 receives the allotment (power generator operation plan including the power generation curtailment plan) from the main control management device 6.

The management unit 71 determines the allotment for each of the power generation devices R based on the received allotment. Further, the management unit 71 transmits the allotment to each of the power generation devices R through the communication unit 72.

Note that the main control management device 6 may be connected to some of the power generation devices R through the communication unit 72 to transmit the allotment to the connected power generation devices R.

The power generation devices R connected to the subsidiary control management device 7 are not particularly limited.

For example, when the power generation devices R are grouped based on types and/or characteristics, the subsidiary control management device 7 may be connected to the power generation devices R included in a group in charge.

For example, it is assumed that the power generation devices R are divided into a photovoltaic power generation device group and a wind power generation device group. It is also assumed that one subsidiary control management device 7 is connected to the photovoltaic power generation device group and another subsidiary control management device 7 is connected to the wind power generation device group. In such a connection, the subsidiary control management device 7 can manage the power generation devices R divided into groups based on types and characteristics for each group.

[Description of Operation]

Next, an operation of the information processing device 1 according to the first example embodiment will be described. More specifically, a calculation used by the planning unit 11 to generate the power generator operation plan will be described. However, the calculation described below is an example of the calculation performed by the planning unit 11. The calculation of the planning unit 11 according to this example embodiment is not limited to the calculation described below.

The planning unit 11 executes the calculation as described below in order to generate (determine) the power generator operation plan. More specifically, the planning unit 11 calculates, as the above calculation, an optimization problem to minimize the operating cost in the entire power system including the power generation device P (first power generation device) and the power generation device R (second power generation device). Note that the optimization problem used herein is a problem to minimize the value of an objective function within a range that satisfies predetermined constraints (constraint conditions).

It is assumed that the objective function in the optimization problem to minimize the operating cost used in the following description is the sum of the operating cost of the power generation device P (first power generation device) and the power generation curtailment penalty cost of the power generation device R (second power generation device). Also, it is assumed that the constraints (constraint conditions) are to match power supply and demand necessary for stable power supply (agreement of supply and demand), ensure a short-period regulation capacity, and ensure an upward spinning reserve and a downward spinning reserve. However, these conditions are not intended to limit this example embodiment.

The objective function used in this case is a function represented by Expression 1. In other words, the optimization problem is a problem to acquire a value of a variable for minimizing the value of the function represented by Expression 1.

$$\sum_{t=1}^{T} \left[ \sum_{i=1}^{N} \{f_{t,i}^{TH}(p_{t,i}^{TH}) + s_i^{TH,cost} \cdot s_{t,i}^{TH}\} + \sum_{i=1}^{M} Q_i^{RE} \cdot C_{t,i}^{RE} \right] \quad \text{[Expression 1]}$$

In Expression 1, the variable t is a variable representing a unit time of the power generator operation plan. T represents a time (period) when a target period for the optimization problem is represented by using the unit time. In other words, Expression 1 represents the sum for the target period.

The first $\Sigma$ in parentheses represents the sum of the operating costs of the power generation devices P (first power generation devices). The variable i in the first $\Sigma$ is a variable for distinguishing the power generation devices P (first power generation devices). N represents the number (total number) of the power generation devices P. $p_{t,i}^{TH}$ represents the power generation output of the i-th power generation device P ($P_i$) at time t. $f_{t,i}^{TH}$ is a function representing a fuel cost for the power generation output of the i-th power generation device P ($P_i$) at time t. $s_i^{TH,cost}$ represents a start cost of the i-th power generation device P ($P_i$). $s_{t,i}^{TH}$ is a variable that takes two values (e.g., variable indicating either "1" or "0") representing start and stop of the i-th power generation device P ($P_i$).

Note that the function $f_{t,i}^{TH}$ is described in detail below.

$$f_{t,i}^{TH}(p) = \sum_{n=0}^{N_{t,i}} c_{t,i,n} p^n \quad \text{[Equation 2]}$$

In other words, the information processing device 1 can use, as the function $f_{t,i}^{TH}$, a polynomial in the term ($N_{t,i}$+1) where the order is $N_{t,i}$ and the n-order coefficient is $c_{t,i,n}$. In many cases, for the function $f_{t,i}^{TH}$, as a quadric that is independent of time t, a function represented by the following Equation 3 can be used as the function $f_{t,i}^{TH}$ $$f_{t,i}^{TH}(p) = \sum_{n=0}^{2} c_{i,n} p^n \quad \text{[Equation 3]}$$

Note that Equation 3 is a special case of Equation 2.

The second Σ in parentheses is the sum of the power generation curtailment penalty costs of the power generation devices R (second power generation devices). The variable i in the second Σ is a variable for distinguishing the power generation devices R. M represents the number (total number) of the power generation devices R (second power generation devices). $Q_i^{RE}$ represents a unit cost (cost) of the power generation curtailment penalty cost of the i-th power generation device R ($Q_i$). The unit cost of the power generation curtailment penalty cost is a value included in the plan necessary information acquired from the information generation device 2. $C_{t,i}^{RE}$ represents curtailed power of the i-th power generation device R ($Q_i$) at time t.

In the above description, T, N, $s_i^{TH,cost}$, M, and $Q_i^{RE}$ are values preliminarily set in the planning unit 11. $f_{t,i}^{TH}$ is a function preliminarily set in the planning unit 11. The planning unit 11 determines each of variables (specifically, $p_{t,i}^{TH}$, $s_{t,i}^{TH}$, and $C_{t,i}^{RE}$) in such a way as to minimize the value of the objective function represented by Expression 1 within a range that satisfies the constraints (constraint conditions) descried below. In other words, each of values for optimizing the objective function is a value included in the power generator operation plan. Note that $C_{t,i}^{RE}$ is a value included in the power generation curtailment plan.

In this manner, the planning unit 11 minimizes (optimizes) the operating cost in the power system by using a solution to an optimization problem including curtailed power ($C_{t,i}^{RE}$) for the power generation device R (second power generation device). Accordingly, the planning unit 11 can generate the power generator operation plan including the power generation curtailment plan associating with the power system including the RE power generator (second power generation device).

Note that, as already described above, the operating cost of the RE power generator (second power generation device) is low. Accordingly, the planning unit 11 can generate, as the solution, the power generation curtailment plan for causing the RE power generator (second power generation device) to operate as much as possible.

Next, the constraint conditions will be described.

The constraint condition for matching of supply and demand is to match "a demand power predicted value" with "a value acquired by subtracting the power curtailment of the power generation devices R (second power generation devices) from the sum of the power generation outputs of the power generation devices P (first power generation devices) and the power generation outputs predicted value of the power generation devices R (second power generation devices).

Here, the power generation output of the power generation device P (first power generation device) is, for example, a power generation output of a base power generation device (base power generator) of the power system, the power generation output of a hydroelectric power generation device, the power generation output of a thermal power generation device, and the power generation output of an energy storage. The base power generation device (base power generator) is a power generation device which has a stable output, like in a nuclear power generation device, and is not greatly regulated of the output power. Note that the base power generator may include a power generation device (e.g., a geothermal power generation device) which has a stable output in the RE power generator and does not regulate the output greatly.

The constraint condition for matching the demand when using the example of the power generation devices P (first power generation devices) described above is represented by using, for example, an expression (equation) expressed by Equation 4.

$$P_t^{BA}+P_t^{HY}+P_t^{TH}+P_t^{ES}+P_t^{RE}-C_t^{RE}=p_t^{DM} \quad \text{[Equation 4]}$$

In Equation 4, $P_t^{BA}$ is the sum of the power generation outputs of all base power generators at time t. $P_t^{HY}$ is the sum of the power generation outputs of all hydroelectric power generation devices at time t. $P_t^{TH}$ is the sum of the power generation outputs of all thermal power generation devices at time t. $P_t^{ES}$ is the sum of the power generation outputs of all energy storages at time t. $P_t^{RE}$ is the sum of the predicted values of the power generation outputs of all power generation devices R (second power generation devices) at time t. Note that $P_t^{RE}$ is a value included in the plan necessary information acquired from the information generation device 2.

$C_t^{RE}$ is the sum of curtailed powers of all power generation devices R (RE power generators) at time t.

$P_t^{DM}$ a predicted value of demand power at time t. $P_t^{DM}$ is a value included in the plan necessary information acquired from the information generation device 2.

The planning unit 11 generates (determines) the power generation curtailment plan described above in such a way as to satisfy the constraint condition for matching the supply and demand. Accordingly, the planning unit 11 can generate the power generator operation plan including the power generation curtailment plan for matching supply power and demand power in each unit time.

Note that the first power generation device has a large reserve capacity. Accordingly, the planning unit 11 generates the power generator operation plan for minimizing the operating cost within a range in which the first power generation device is operated in such a way as to ensure the reserve capacity.

The constraint condition for ensuring a short-period regulation capacity is a constraint condition relating to a short-period regulation capacity based on a power generation device, which can regulate a power output in a short period with respect to a short-period fluctuation of the demand power and a short-period power fluctuation generated by the second power generation device, among power generation devices included in the power generation devices P (first power generation devices). For example, in the devices included in the power generation devices P (first power generation devices), the thermal power generation device and the energy storage are devices having a high short-period regulation capacity. Note that the energy storage is a device for storing energy (e.g., a storage battery or a pumped-storage power generation device). In this case, the constraint condition for ensuring the short-period regulation capacity is a constraint condition for setting "the sum of the short-period regulation capacities of the thermal power generation device and the energy storage which are included in the power generation devices P (first power generation devices)" to be equal to or more than "a short-period power fluctuation". The constraint condition for ensuring the short-period regulation capacity in this case is represented by, for example, an expression (inequality) expressed by Inequality 5.

$$L_t^{TH}+L_t^{ES} \geq \Delta_t^s = g_t^s(C_{t,1}^{RE}, \ldots, C_{t,M}^{RE}) \quad \text{[Inequality 5]}$$

In Inequality 5, $L_t^{TH}$ is the sum of the short-period regulation capacities of running thermal power generation devices at time t. $L_t^{ES}$ is the sum of the short-period regulation capacities of all energy storages at time t. $\Delta_t^s$ is the short-period fluctuating power at time t. More specifically, $\Delta_t^S$ is a value defined based on the function $g_t^S$ using "$C_{t,1}^{RE}$, ..., and $C_{t,M}^{RE}$" as dependent variables. The function $g_t^S$ is a function preliminarily set in the planning unit 11. The function $g_t^S$ associates with the short-period fluctuation predicted value of the power generation device R (second power generation device).

Note that a specific example of the function $g_t^S$ is a function represented by Inequality 5.

The planning unit 11 generates (determines) the power generator operation plan including the power generation curtailment plan described above in such a way as to ensure the short-period regulation capacity.

Note that the power generation device R (second power generation device) has a large short-period fluctuation predicted value. However, the planning unit 11 generates (determines) the power generator operation plan including the power generation curtailment plan in such a way as to satisfy the constraint condition for ensuring the short-period regulation capacity. Accordingly, the planning unit 11 can generate the power generator operation plan for minimizing the value of the operating cost while associating with the short-period fluctuation based on the power generation device R (second power generation device).

The constraint condition for ensuring the upward spinning reserve is a constraint condition to set "the sum of the maximum outputs of running power generation devices P (first power generation devices)" to be equal to or more than "the sum of net demand power predicted value, the short-period fluctuating power, and the prediction error power". For example, when the power generation devices P include a hydroelectric power generation device, a thermal power generation device, and an energy storage, the constraint condition for ensuring the upward spinning reserve is an inequality expressed by Inequality 6.

Note that the term "net demand power predicted value" is a value acquired by subtracting the power generation predicted value of the power generation device R (second power generation device) from the demand power predicted value.

The constraint condition for ensuring the downward spinning reserve is a constraint condition to set "the sum of the minimum outputs of running power generation devices P (first power generation device)" to be equal to or less than "a value acquired by subtracting the short-period fluctuating power and prediction error power from the net demand power predicted value". For example, when the power generation devices P include a hydroelectric power generation device, a thermal power generation device, and an energy storage, the constraint condition for ensuring the downward spinning reserve is represented by an expression (inequality) expressed by Inequality 7. $\Delta_t^I$ in Inequalities 6 and 7 is a value represented by an expression (equation indicating a function) expressed by Equation 8.

$$P_t^{DM} - P_t^{BA} - P_t^{RE} + C_t^{RE} + \Delta_t^S + \Delta_t^I \leq P_t^{HY,max} + P_t^{TH,max} + P_t^{ES-d,max}$$ [Inequality 6]

$$P_t^{DM} - P_t^{BA} - P_t^{RE} + C_t^{RE} - \Delta_t^S - \Delta_t^I \geq P_t^{HY,min} + P_t^{TH,min} - P_t^{ES-c,max}$$ [Inequality 7]

$$\Delta_t^I = g_t^I(C_{t,1}^{RE}, \ldots, C_{t,M}^{RE})$$ [Equation 8]

In Inequalities 6 and 7, "$P_t^{DM} - P_t^{BA} - P_t^{RE}$" is the net demand power predicted value.

In Inequality 6, $P_t^{HY,max}$ is the sum of the maximum power generation outputs of running hydroelectric power generation devices at time t. $P_t^{TH,max}$ is the sum of the maximum power generation outputs of running thermal power generation devices at time t. $P_t^{ES-d,max}$ is the sum of the maximum power generation outputs of the discharging energy storages at time t.

In Inequality 7, $P_t^{HY,min}$ is the sum of the minimum power generation outputs of the running hydroelectric generators at time t. $P_t^{TH,min}$ is the sum of the minimum power generation outputs of running thermal generators at time t. $P_t^{ES-c,min}$ is the sum of the maximum charge inputs of charging energy storages at time t.

In Equation 8, $\Delta_t^I$ is a variable indicating prediction error power at time t. As represented by Equation 8, $\Delta_t^I$ is defined based on the function $g_t^I$ using "$C_{t,1}^{RE}$, ..., $C_{t,M}^{RE}$" as dependent variables. Note that the function $g_t^I$ is preliminarily set in the planning unit 11.

Note that a specific example of the function $g_t^I$ is a function in which a variable is changed as needed in the function represented by Inequality 5.

The planning unit 11 generates (determines) the power generator operation plan including the power generation curtailment plan in such a way as to satisfy the constraint conditions described above. Accordingly, the planning unit 11 can generate (determine) the power generator operation plan including the power generation curtailment plan while ensuring the regulation capacity (upward spinning reserve and downward spinning reserve).

Note that the power generation device R (second power generation device) has a large prediction error. However, the planning unit 11 can generate (determine) the power generator operation plan for minimizing the value of the operating cost while reducing the prediction error based on the power generation device R by using the constraint conditions described above.

Note that Expression 1, Equations 3 to 4 and Inequalities 5 to 8 described above are examples of the constraint conditions. The information processing device 1 may further add other constraint conditions to the above expressions. Alternatively, the information processing device 1 may use other constraint conditions in place of the constraint conditions described above.

Note that the functions $f_{t,i}^{TH}$, $g_t^S$, and $g_t^I$ are desirably linear functions. The planning unit 11 may use an approximate function (e.g., a piecewise linear function) when the function $f_{t,i}^{TH}$, $g_t^S$, or $g_t^I$ is a convex function.

The planning unit 11 can solve the above-described optimization problem (objective function) by using various techniques. For example, the planning unit 11 can solve the optimization problem by using mathematical programming or metaheuristic. For example, when the optimization problem is a mixed-integer linear programming problem, the planning unit 11 may use mixed integer linear programming. Alternatively, when the optimization problem is a mixed-integer quadratic programming problem, the planning unit 11 may use mixed integer quadratic programming. More alternatively, when the optimization problem is a mixed-integer nonlinear programming problem, the planning unit 11 may use simulated annealing, genetic algorithm, or a metaheuristic such as particle swarm optimization.

As a result, the planning unit 11 can generate (determine) the power generator operation plan including the power generation curtailment plan as described above.

[Description of Advantageous Effects]

Next, advantageous effects of the information processing device 1 according to the first example embodiment will be described.

As described above, the information processing device 1 can achieve an advantageous effect of generating the power generation curtailment plan associating with the power system including the RE power generator (second power generation device).

This is because the planning unit 11 generates the power generator operation plan including the power generation curtailment plan by using the power generation curtailment penalty cost in the RE power generator (second power generation device), or the like.

Further, the information processing device 1 can achieve an advantageous effect of generating the power generator operation plan including the power generation curtailment plan for matching demand power and supply power in each unit time.

This is because the planning unit 11 of the information processing device 1 generates the power generator operation plan including the power generation curtailment plan in such a way as to satisfy the constraints (constraint conditions) including the predicted value of the sum of the power generation outputs of the RE power generators (second power generation devices) based on the constraint condition for matching of supply and demand. In other words, this is because the planning unit 11 generates the power generator operation plan in consideration of future fluctuations.

Further, the information processing device 1 can achieve an advantageous effect of generating the power generator operation plan including the power generation curtailment plan in which the short-period regulation capacity is ensured.

This is because the planning unit 11 generates the power generator operation plan including the power generation curtailment plan so that the short-period regulation capacity included in a power system can handle a short-period fluctuation based on the constraint condition for ensuring the short-period regulation capacity.

Furthermore, the information processing device 1 can achieve an advantageous effect of generating the power generator operation plan including the power generation curtailment plan in which the regulation capacity is ensured.

This is because the planning unit 11 can generate the power generator operation plan including the power generation curtailment plan in which the upward spinning reserve and the downward spinning reserve are ensured based on the constraint condition for ensuring the upward spinning reserve and the downward spinning reserve.

Detailed Examples of Short-Period Fluctuating Power and Prediction Miscalculation Error Power Next, detailed examples of the short-period fluctuating power ($\Delta_t^S$) and the prediction error power ($\Delta_t^I$) used by the planning unit 11 according to this example embodiment will be described.

(1) First Detailed Example

A first detailed example is an example of a case where the power generation devices R (second power generation devices) include a photovoltaic power generation device and a wind power generation device. The planning unit 11 generates (determines) the power generation curtailment plan for each of the photovoltaic power generation device and the wind power generation device. Note that the power generation devices R (second power generation devices) may include a plurality of photovoltaic power generation devices and/or a plurality of wind power generation devices. In this case, the planning unit 11 may execute the following operation on each group by dividing the power generation devices R (second power generation devices) into a photovoltaic power generation device group and a wind power generation device group.

Note that the optimization problem used by the planning unit 11 is an optimization problem including all groups. Accordingly, the planning unit 11 can generate (determine) the power generation curtailment plan for the photovoltaic power generation device and the power generation curtailment plan for the wind power generation device simultaneously.

In the case of the first detailed example, the planning unit 11 can use, for example, expressions (equations indicating functions) as represented by Equations 9 and 10, as short-period fluctuating power $\Delta_t^S$ and prediction error power $\Delta_t^I$. Note that in Equations 9 and 10, M represents the number (total number) of the power generation devices R (second power generation devices).

$$\Delta_t^S = \sqrt{\left(\sigma_t^{DM,sfluc} \cdot P_t^{DM}\right)^2 + \sum_{i=1}^{M}\left\{\sigma_{t,i}^{RE,sfluc}(P_{t,i}^{RE} - C_{t,i}^{RE})\right\}^2} \quad \text{[Equation 9]}$$

$$\Delta_t^I = \sqrt{\left(\sigma_t^{DM,perr} \cdot P_t^{DM}\right)^2 + \sum_{i=1}^{M}\left\{\sigma_{t,i}^{RE,perr}(P_{t,i}^{RE} - C_{t,i}^{RE})\right\}^2} \quad \text{[Equation 10]}$$

In Equation 9, $\sigma_t^{DM,sfluc}$ is a short-period fluctuation rate of demand power at time t. $\sigma_{t,i}^{RE,sfluc}$ is a short-period fluctuation rate of the power generation output of the i-th power generation device R ($Q_i$) at time t. $P_{t,i}^{RE}$ is a predicted value of the power generation output of the i-th power generation device R ($Q_i$) at time t.

In Equation 10, $\sigma_t^{DM,perr}$ is a prediction error rate of the demand power predicted value at time t. $\sigma_{t,i}^{RE,perr}$ is a prediction error rate of the power generation output predicted value of the i-th power generation device R ($Q_i$) at time t.

These values are values included in the plan necessary information acquired from the information generation device 2.

(2) Second Detailed Example

A second detailed example is an example of a case where the power generation devices R (second power generation devices) include a two-system photovoltaic power generation device. The planning unit 11 generates the power generation curtailment plan for the photovoltaic power generation device in each of systems.

Note that the photovoltaic power generation device of each system may include a plurality of photovoltaic power generation devices. In this case, the power generation devices R which are photovoltaic power generation devices are preliminarily divided into two groups based on the characteristics (e.g., an output characteristic and the like) of the power generation devices R (second power generation devices).

Like in the first detailed example, also in the second detailed example, the planning unit 11 can simultaneously generate (determine) the power generation curtailment plans for the power generation devices R of two systems.

In the case of the second detailed example, the planning unit 11 can use, for example, expressions (equations indicating functions) as represented by Equations 11 and 12 as short-period fluctuating power $\Delta_t^S$ and prediction error power $\Delta_t^l$. Note that in Equations 11 and 12, M represents the number (total number) of the power generation devices R (second power generation devices).

$$\Delta_t^s = \sqrt{\left(\sigma_t^{DM,sfluc} \cdot P_t^{DM}\right)^2 + \left\{\sum_{i=1}^{M} \sigma_{t,i}^{RE,sfluc}(P_{t,i}^{RE} - C_{t,i}^{RE})\right\}^2}$$ [Equation 11]

$$\Delta_t^l = \sqrt{\left(\sigma_t^{DM,perr} \cdot P_t^{DM}\right)^2 + \left\{\sum_{i=1}^{M} \sigma_{t,i}^{RE,perr}(P_{t,i}^{RE} - C_{t,i}^{RE})\right\}^2}$$ [Equation 12]

Note that each of variables in Equations 11 and 12 corresponds to each of the variables described above in Equations 9 and 10.

Hardware Configuration Example

The information processing device 1 described above is configured as the following.

For example, each component of the information processing device 1 may be configured by a hardware circuit.

Alternatively, in the information processing device 1, each component may be configured by using a plurality of devices connected via a network.

Alternatively, in the information processing device 1, a plurality of components may be composed of one piece of hardware.

Alternatively, the information processing device 1 may be implemented as a computer device including a central processing unit (CPU), a read only memory (ROM), and a random access memory (RAM).

The information processing device 1 may be implemented as a computer device further including an input and output circuit (IOC) and a network interface circuit (NIC) in addition to the above-described configuration.

Figure 5:
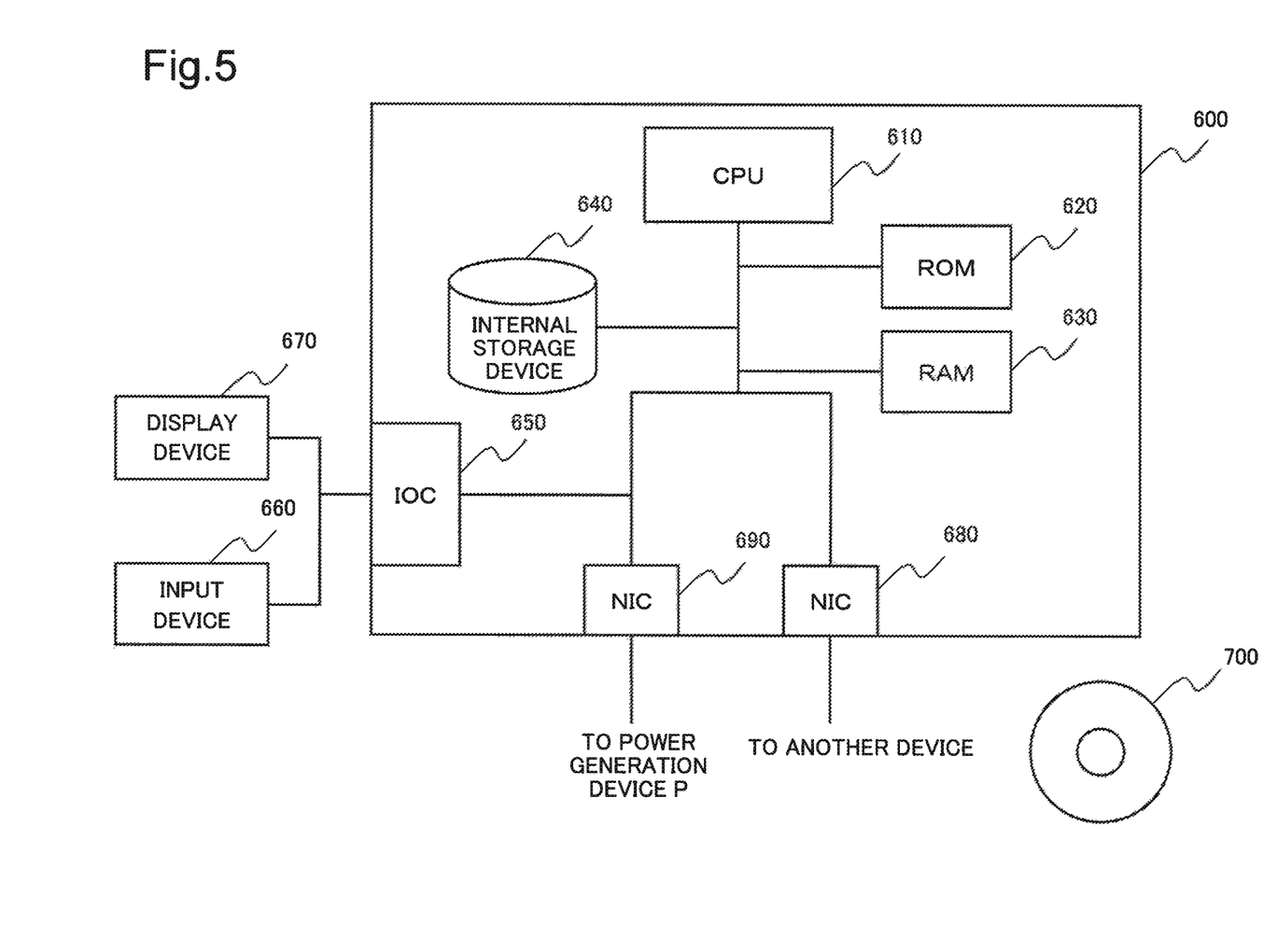
FIG. 5 is a block diagram illustrating an example of a hardware configuration of the information processing device according to the first example embodiment.

FIG. 5 is a block diagram illustrating an example of a configuration of an information processing device 600 according to this hardware configuration example.

The information processing device 600 includes a CPU 610, a ROM 620, a RAM 630, an internal storage device 640, an IOC 650, an NIC 680, and an NIC 690, and constitutes a computer device.

The CPU 610 reads a program from the ROM 620. Further, the CPU 610 controls the RAM 630, the internal storage device 640, the IOC 650, the NIC 680, and the NIC 690 based on the read program. Then, the computer including the CPU 610 controls these components and realizes the functions as the planning unit 11 and the communication unit 12 illustrated in FIG. 1.

The CPU 610 may use the RAM 630 or the internal storage device 640 as a temporary storage medium for the program when the functions are implemented.

The CPU 610 may read a program included in a non-transitory or transitory storage medium 700, which stores a program in a computer-readable manner, by using a storage medium reading device that is not illustrated.

Alternatively, the CPU 610 may receive a program from an external device, which is not illustrated, through the NIC 680 or the NIC 690, store the received programs in the RAM 630, and operate based on the stored programs.

The ROM 620 stores a program and fixed data to be executed by the CPU 610. The ROM 620 is, for example, a programmable-ROM (P-ROM), a flash ROM, a mask ROM, or an erasable P-ROM (EPROM).

The RAM 630 temporarily stores a program to be executed by the CPU 610 and data. The RAM 630 is, for example, a dynamic-RAM (D-RAM).

The internal storage device 640 stores data and a program which are stored by the information processing device 600 for a long period of time. The internal storage device 640 may operate as a temporary storage device for the CPU 610. The internal storage device 640 is, for example, a hard disk device, an optical disk device, a magneto-optical disk device, a solid state drive (SSD), a magnetic tape device, or a disk array device.

The ROM 620 and the internal storage device 640 are non-transitory storage media. On the other hand, the RAM 630 is a transitory storage medium. The CPU 610 can operate based on a program stored in the ROM 620, the internal storage device 640, or the RAM 630. In other words, the CPU 610 can operate by using a non-transitory storage medium or a transitory storage medium.

The IOC 650 relays data between the CPU 610 and an input device 660 and between the CPU 610 and a display device 670. The IOC 650 is, for example, an IO interface card or a universal serial bus (USB) card. Further, the IOC 650 may use not only a wire connection, such as a USB, but also a wireless connection.

The input device 660 is a device that receives an input instruction from an operator of the information processing device 600. The input device 660 is, for example, a keyboard, a mouse, or a touch panel.

The display device 670 is a device that displays information to the operator of the information processing device 600. The display device 670 is, for example, a liquid crystal display.

The NIC 680 relays exchange of data with external devices (e.g., the information generation device 2 and the control management device 3), which are not illustrated in FIG. 5, through a communication path or a network which is not illustrated.

The NIC 690 relays exchange of data with the power generation device P through a communication path or a network which is not illustrated.

The NIC 680 and the NIC 690 are, for example, LAN cards. Further, the NIC 680 and the NIC 690 may use not only a wire connection but also a wireless connection.

The information processing device 600 having the configuration described above can achieve advantageous effects similar to those of the information processing device 1.

This is because the CPU 610 of the information processing device 600 can realize functions similar to those of the information processing device 1 based on the program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SINGS LIST

1 Information processing device
2 Information generation device
3 Control management device
4 Main information generation device
5 Subsidiary information generation device
6 Main control management device
7 Subsidiary control management device
9 Power generation system 11 Planning unit
12 Communication unit
21 Generation unit
22 Communication unit
31 Management unit
32 Communication unit
41 Generation unit
42 Communication unit
51 Generation unit
52 Communication unit
61 Management unit
62 Communication unit
71 Management unit
72 Communication unit
600 Information processing device
610 CPU
620 ROM
630 RAM
640 Internal storage device
650 IOC
660 Input device
670 Display device
680 NIC
690 NIC
700 Storage medium

The invention claimed is:

1. An information processing device comprising:
a processor; and
a memory including a program,
wherein, the processor reading the program and configured to:
receive plan necessary information being information including information relating to a first power generation device and a second power generation device having a power generation output that is more susceptible to an external environment than a power generation output of the first power generation device;
generate power generator operation plans, for the first power generation device and the second power generation device, that include a power generation curtailment plan to curtail a power generation output in the second power generation device, based on the plan necessary information and an operating cost in a power system including the first power generation device and the second power generation device; transmit a power generator operation plan for the first power generation device; and transmit a power generator operation plan including a power generation curtailment plan for the second power generation device to a device controlling or managing the second power generation device.

2. The information processing device according to claim 1,
wherein the processor further configured to generate the power generator operation plans for the first power generation device and the second power generation device in such a way as to minimize the operating cost in the power system including the first power generation device and the second power generation device.

3. The information processing device according to claim 1,
wherein the plan necessary information includes a predicted value of demand power in the power system, a predicted value of the power generation output for the second power generation device, and a power generation curtailment penalty cost as a cost in a predetermined time unit when the second power generation device is curtailed.

4. The information processing device according to claim 3,
wherein the plan necessary information includes a prediction error rate of the predicted value of demand power in the power system, and a prediction error rate of the predicted value of the power generation output for the second power generation device.

5. The information processing device according to claim 1,
wherein the processor further configure to generate the power generator operation plan for matching demand and supply of power in the power system.

6. The information processing device according to claim 1,
wherein the processor further configured to generate the power generator operation plan for ensuring a short-period regulation capacity as a regulation capacity in a period shorter than a management unit time interval in the power system.

7. The information processing device according to claim 1,
wherein the processor further configured to generate the power generator operation plan for ensuring a regulation capacity in the power system.

8. The information processing device according to claim 1,
wherein the second power generation device is a power generation device using renewable energy.

9. An information processing method comprising:
receiving plan necessary information being information including information relating to a first power generation device and a second power generation device having a power generation output that is more susceptible to an external environment than a power generation output of the first power generation device;
generating power generator operation plans, for the first power generation device and the second power generation device, that include a power generation curtailment plan to curtail a power generation output in the second power generation device, based on the plan necessary information and an operating cost in a power system including the first power generation device and the second power generation device;
transmitting a power generator operation plan for the first power generation device; and
transmitting a power generator operation plan including a power generation curtailment plan for the second power generation device to a device controlling or managing the second power generation device.

10. A non-transitory computer-readable recording medium embodying a program, the program causing a computer to perform a method, the method comprising:
receiving plan necessary information being information including information relating to a first power generation device and a second power generation device having a power generation output that is more susceptible to an external environment than a power generation output of the first power generation device;
generating power generator operation plans, for the first power generation device and the second power generation device, that include a power generation curtailment plan to curtail a power generation output in the second power generation device, based on the plan necessary information and an operating cost in a power system including the first power generation device and the second power generation device;

transmitting a power generator operation plan for the first power generation device; and transmitting a power generator operation plan including a power generation curtailment plan for the second power generation device to a device controlling or managing the second power generation device.

* * * * *

UNITED STATES PATENT AND TRADEMARK OFFICE
CERTIFICATE OF CORRECTION

PATENT NO. : 10,511,175 B2
APPLICATION NO. : 15/778741
DATED : December 17, 2019
INVENTOR(S) : Takuma Kogo and Ryo Hashimoto Page 1 of 1

It is certified that error appears in the above-identified patent and that said Letters Patent is hereby corrected as shown below:

In the Specification

Column 14, Lines 4-5 [Equation 4]; Delete "$P_t^{BA}+P_t^{HY}+P_t^{TH}+P_t^{ES}+P_t^{RE}-C_t^{RE}=p_t^{DM}$" and insert --$P_t^{BA}+P_t^{HY}+P_t^{TH}+P_t^{ES}+P_t^{RE}-C_t^{RE}=P_t^{DM}$-- therefor Column 15, Line 51; Delete "$\Delta_t^{1}$" and insert --$\Delta_t^{l}$-- therefor Column 15, Lines 54-55 [Inequality 6]; Delete "$P_t^{DM}-P_t^{BA}-P_t^{RE}+C_t^{RE}+\Delta_t^s+\Delta_t^l \leq P_t^{HY,max}+p_t^{TH,max}+P_t^{ES-d,max}$" and insert --$P_t^{DM}-P_t^{BA}-P_t^{RE}+C_t^{RE}+\Delta_t^s+\Delta_t^l \leq P_t^{HY,max}+P_t^{TH,max}+P_t^{ES-d,max}$-- therefor Column 17, Line 47; Before "Error", delete "Miscalculation"

Column 17, Line 50; Delete "$(\Delta_r^l)$" and insert --$(\Delta_t^l)$-- therefor Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*